(No Model.) 2 Sheets—Sheet 1.

D. H. ERDMAN.
FURNACE.

No. 449,931. Patented Apr. 7, 1891.

WITNESSES:
L. Douville,
Robt. Aiton.

INVENTOR
Daniel H. Erdman.
BY Oberstheim & Kintner
ATTORNEYS.

(No Model.) 2 Sheets—Sheet 2.

D. H. ERDMAN.
FURNACE.

No. 449,931. Patented Apr. 7, 1891.

Witnesses
Theo. Rollé.
A. P. Jennings.

Inventor
Daniel H. Erdman
By his Attorneys
Briesen & Kintner

UNITED STATES PATENT OFFICE.

DANIEL H. ERDMAN, OF CAMDEN, NEW JERSEY.

FURNACE.

SPECIFICATION forming part of Letters Patent No. 449,931, dated April 7, 1891.

Application filed December 11, 1888. Serial No. 293,260. (No model.)

*To all whom it may concern:*

Be it known that I, DANIEL H. ERDMAN, a citizen of the United States, residing in the city and county of Camden, State of New Jersey, have invented a new and useful Improvement in Furnaces, which improvement is fully set forth in the following specification and accompanying drawings.

My invention consists of a furnace having both inner and outer casings with an intervening corrugated partition supported on a plate between openings therein, one of said casings having a flange bearing against said corrugated plate to keep the same in place.

Figure 1:
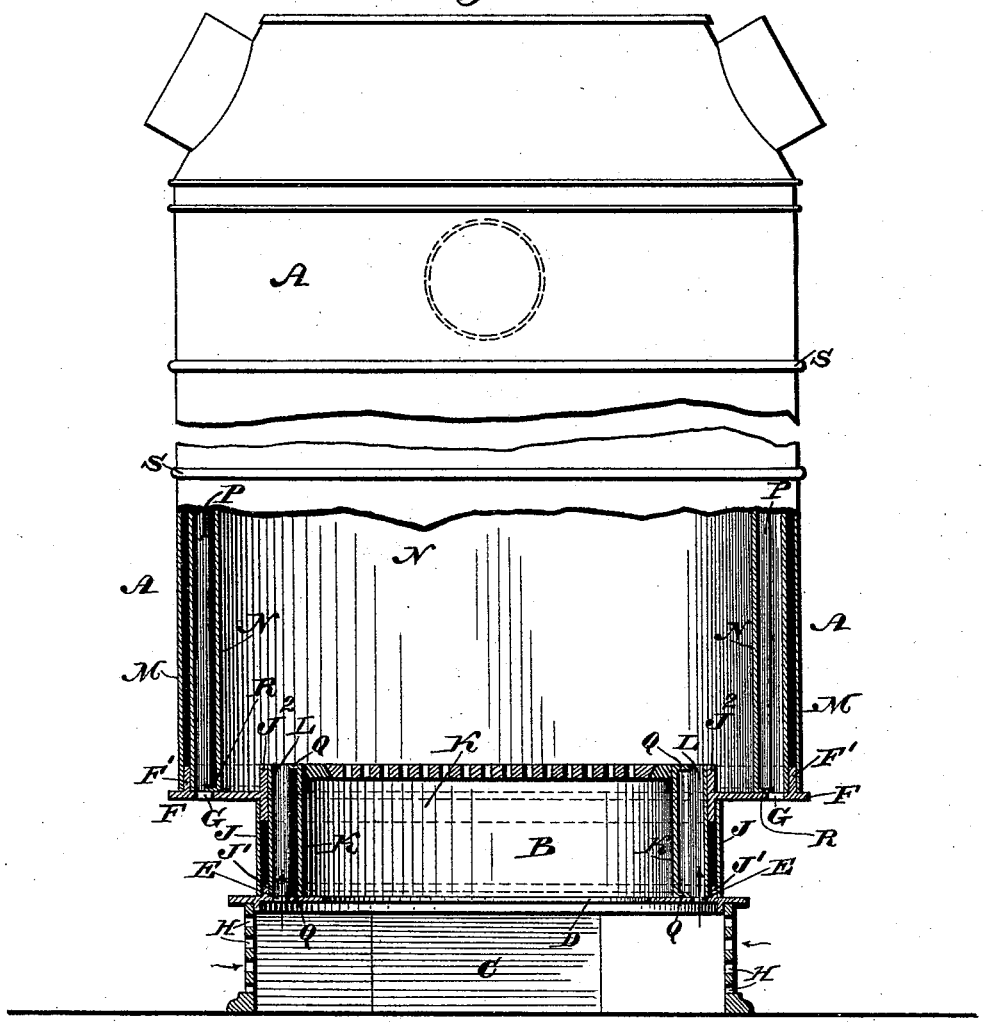
Figure 2:
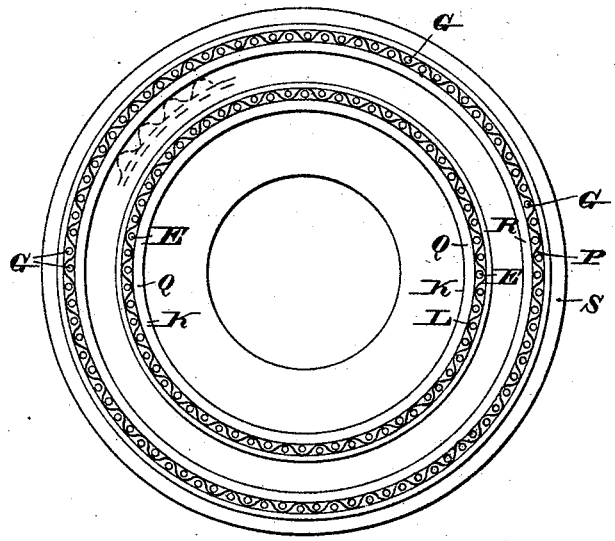
Figure 3:
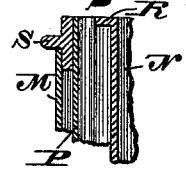

Figure 1 represents a vertical section of a furnace embodying my invention. Fig. 2 represents a top or plan view thereof. Fig. 3 represents a vertical section of a portion on an enlarged scale.

Similar letters of reference denote corresponding parts in the several figures.

Referring to the drawings, A designates the casing of a furnace, B the grate-chamber, and C the ash-pit.

In the plate D at the top of the ash-pit near the rim thereof are perforations E, and in the plate F at the bottom of the casing A near the rim thereof are perforations G, both sets of perforations communicating with the atmosphere, it being noticed that air enters the perforations E through the openings H in the wall of the ash-pit.

Within the wall J of the chamber B is a wall K, between which walls is a corrugated plate L. Within the wall M of the casing is a wall N, between which walls is a corrugated plate P, it being noticed that the corrugated plate L is between the perforations E and on the plate D, and the corrugated plate P is between the perforations G and on the plate F, whereby channels or passages are formed between the said corrugated plates and the casings. At the top and bottom of the inner wall K of the chamber B are flanges Q, which extend horizontally and bear against the corrugated plate L. At the top and bottom of the inner wall N of the casing are flanges R, which extend horizontally and bear against the corrugated plate P, it being noticed that the top of the casing is encircled by a rim S, preferably of cast metal, said casing being, as usual, formed of sheet metal.

The operation is as follows: Air enters the openings H and passes through the perforations E, and so reaches the space between the walls J K, said space being occupied by the corrugated plate L, whereby the air reaches the interior of the casing A at the bottom thereof in numerous currents, owing to said corrugated plate. Air also enters the openings G and passes through the space between the plates M N of the casing in numerous currents, owing to the corrugated plate P, into the dome or hot chamber at the top of the furnace, it being noticed that as the air admitted through the opening G discharges at the top of the casing its upward draft is increased, owing to the heating of the same by contact with the heated wall N, so that an increased volume of air is directed into the drum or hot-air chamber, whereby a large volume of heat will be directed to the place of service. Owing to the passage of fresh air between the corrugated plate L and the outer wall J of the chamber B and that between the corrugated plate P and outer wall M of the casing said walls are kept comparatively cool, by which means loss of heat by radiation into the cellar or apartment containing the furnace is prevented. It will also be seen that the corrugated plates prevent the closing of the space between the respective walls, and the flanges at the top and bottom of the inner walls hold the respective corrugated plates in position, the corrugated plate L being pressed against the bottom flange J' and top rim $J^2$ of the outer wall J of the grate-chamber and the corrugated plate P being pressed at bottom against the flanged rim F' of the plate F and at top against the band or ring S.

It is evident that the number of inner walls and corrugated plates may be multiplied, thus increasing the currents of air directed into the casing.

Having thus described my invention, what I claim as new, and desire to secure by Letters Patent, is—

A furnace having inner and outer casings, a corrugated partition or plate between said casings, a supporting-plate with openings between which the partition-plate rests on the said supporting-plate, and a flange connected with one of the said casings and bearing against the corrugated plate for keeping the same in place, said parts being combined, substantially as described.

DANIEL H. ERDMAN.

Witnesses:
JOHN A. WIEDERSHEIM,
A. P. JENNINGS.